United States Patent [19]

Rasmussen et al.

[11] 4,372,451

[45] Feb. 8, 1983

[54] GRAVITY-FEED STORAGE AND DELIVERY SYSTEM

[75] Inventors: George E. Rasmussen, Richton Park, Ill.; Lucius B. Donkle, Jr., Michigan City, Ind.

[73] Assignee: Interlake, Inc., Oak Brook, Ill.

[21] Appl. No.: 163,342

[22] Filed: Jun. 26, 1980

[51] Int. Cl.³ .............................................. A47F 5/00
[52] U.S. Cl. .................................. 211/187; 211/151; 211/184
[58] Field of Search ............ 211/490, 184, 151, 189, 211/186; 108/60, 61

[56] References Cited

U.S. PATENT DOCUMENTS

| | | | |
|---|---|---|---|
| 3,063,534 | 4/1961 | St. Amour | 193/38 |
| 3,900,112 | 8/1975 | Azzi | 211/151 X |
| 4,168,780 | 9/1979 | Parrott | 211/151 |
| 4,183,438 | 1/1980 | Huczek | 211/184 X |

OTHER PUBLICATIONS

"Quick-Pik Order Picking Systems", Midland-Ross Corp., 12 pages.

*Primary Examiner*—Francis K. Zugel
*Assistant Examiner*—Robert W. Gibson, Jr.
*Attorney, Agent, or Firm*—Dithmar, Stotland, Stratman & Levy

[57] ABSTRACT

A gravity-feed merchandise storage and delivery rack includes upstanding support columns and a plurality of vertically-spaced storage shelves mounted upon the support columns by means of mounting clips; each storage shelf includes rearward and forward side frame members interconnected by splice members including offset portions so that the forward side frame member is offset outwardly with respect to the rearward side frame member to facilitate passage of merchandise thereby; an intermediate guide member on the storage shelf having a pin adjustably positioned thereon and extending downwardly therefrom to engage in openings in a channel member extending transversely of the storage shelf; and a shelf support infinitely adjustable upon an intermediate support column for supporting an elongated storage shelf intermediate the front and rear thereof.

16 Claims, 13 Drawing Figures

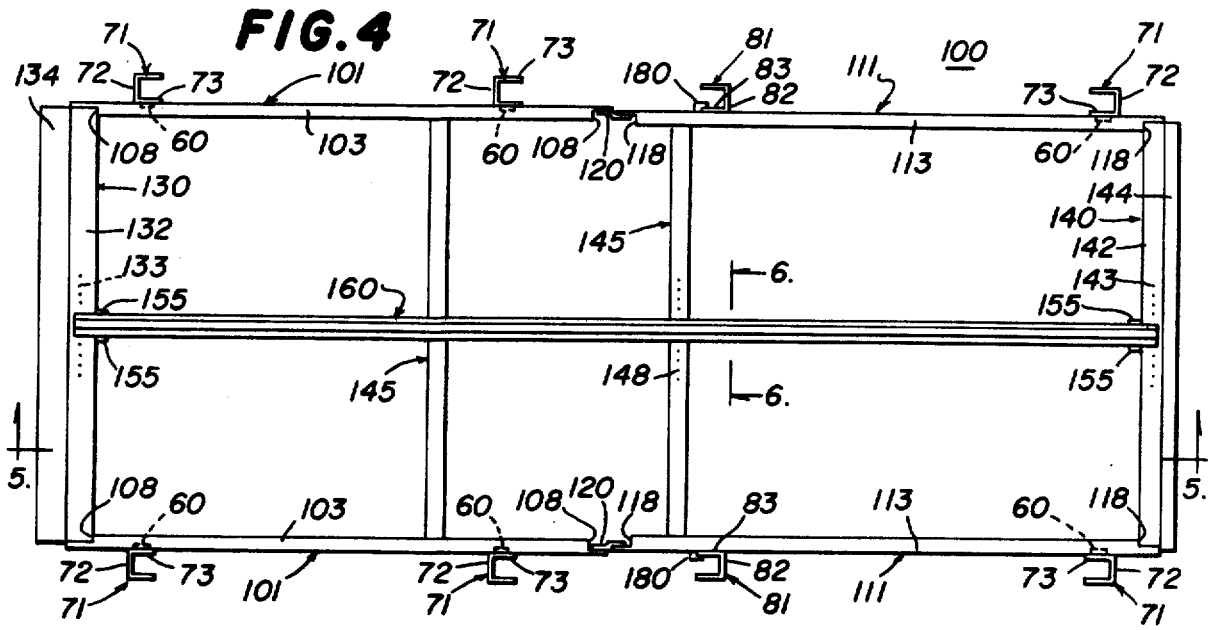
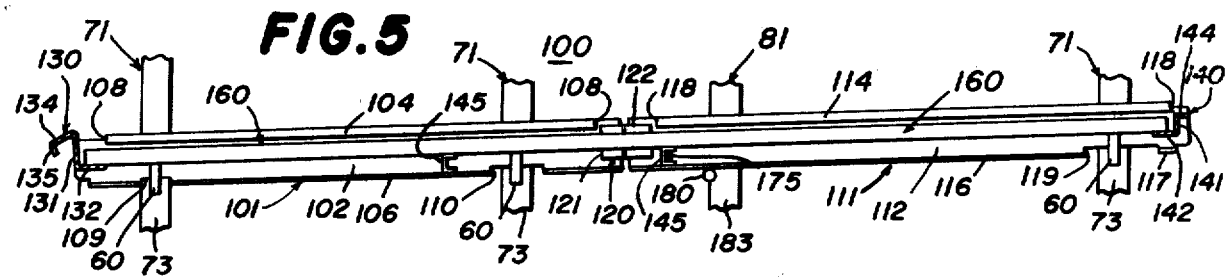
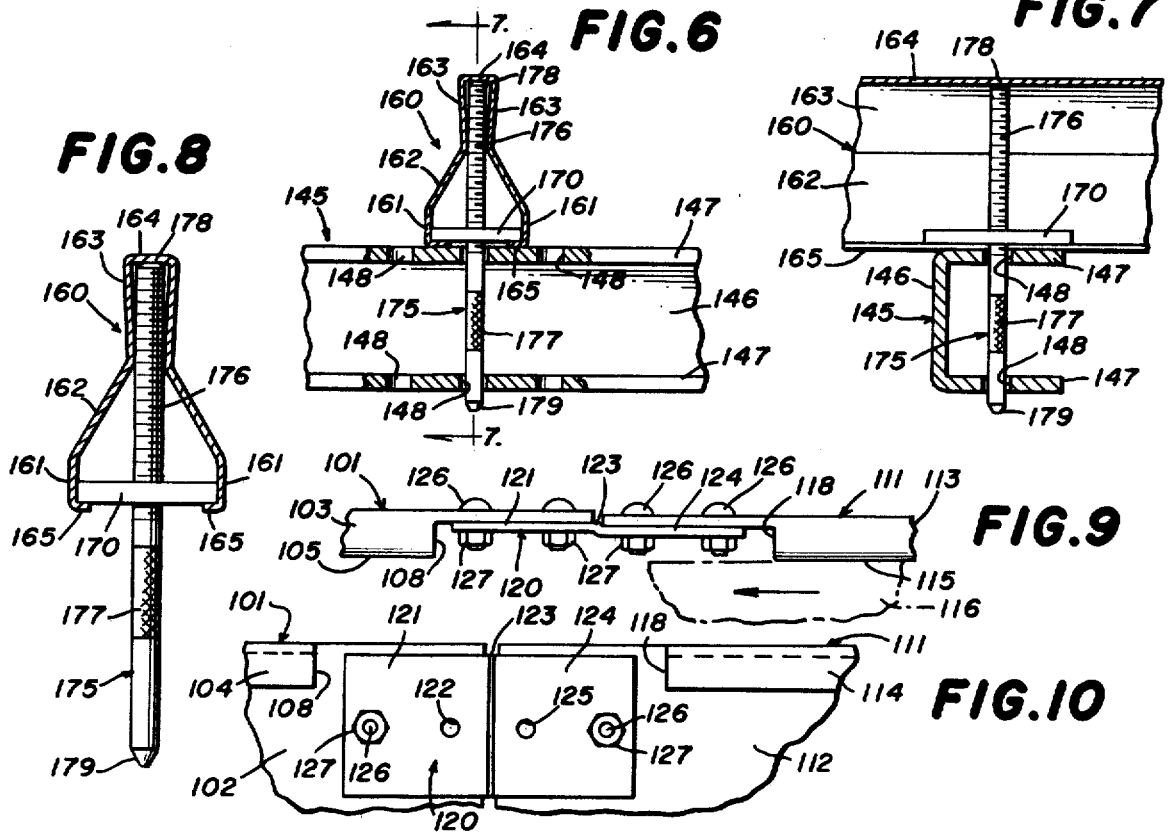

GRAVITY-FEED STORAGE AND DELIVERY SYSTEM

BACKGROUND OF THE INVENTION

The present invention relates to gravity-feed storage and delivery systems for automatically conveying merchandise from a storage position to a delivery position, and particularly to an improved storage shelf and shelf support for use in such systems including an improved intermediate guide member separating rows of merchandise from each other.

The present invention is an improvement upon the applicants' invention disclosed and claimed in U.S. Ser. No. 136,396 filed Apr. 1, 1980 for Gravity-Feed Storage and Delivery System. Such gravity-feed storage and delivery systems are also disclosed in U.S. Pat. Nos. 3,063,534 granted Nov. 13, 1962 to J. St.Amour and 3,900,112 granted Aug. 19, 1975 to V. D. Azzi et al. As outlined in that prior patent application and those patents, such systems afford a number of advantages over standard shelving in industry, warehousing and retailing applications. Such rack assemblies typically comprise a plurality of vertically-spaced storage shelves mounted upon upstanding support frames, the storage shelves being inclined slightly from the horizontal to provide an inclined ramp down which merchandise can slide from the back to the front of the rack assembly. Prior art arrangements include vertical-front racks with the front columns of the support frames being vertical and with the front edges of the shelf frames all being in vertical alignment with one another. There are also provided "layback" arrangements, wherein the front support columns of the support frames are inclined rearwardly, with the shelf frames being arranged in a front-to-back staggered relationship to facilitate access to the merchandise stored thereon, particularly the removal of individual items from cartons.

In both of the standard arrangements, the storage shelves are connected at the same points thereon to the support frames by means of hanger clips or the like, the clips typically fitting into cutout notches or recesses in the shelf frames. There is no provision for supplying support for the storage shelf intermediate the ends thereof in the case of a long storage shelf, such intermediate support requiring an infinitely adjustable relationship between the mounting clip and the intermediate support frame member. Difficulty also has been encountered in providing intermediate guide members for such unusually long storage shelves, the intermediate guide members being useful to separate adjacent rows of merchandise from each other. Typically, support must be provided adjacent to the center of the intermediate guide member to prevent bowing thereof upon contact by merchandise, yet such connecting structure cannot be reached from the ends of the storage shelf when the storage shelf has a length of eight feet or greater.

Finally, when constructing extremely long storage shelves, it is necessary to interconnect two or more side frame members, such interconnection often providing obstructions which interfere with the smooth flow of merchandise down the storage shelf from the storage area to the delivery area.

SUMMARY OF THE INVENTION

The present invention provides an improved gravity-feed merchandise storage and delivery rack, and particularly an improved storage shelf construction particularly useful in providing long storage shelves including improved intermediate guide members, improved splice structure to interconnect the side frame members of the storage shelf, and improved shelf support intermediate the ends of the storage shelf. P It is the general object of this invention to provide an improved storage shelf of extended length having an intermediate guide member for separating adjacent rows of merchandise from each other, the intermediate guide member being connected to the support frame intermediate the ends thereof by a structure that is readily removable for adjustment purposes from the ends of the intermediate guide member.

Another object of the invention is to provide an elongated storage shelf made up of two or more side frame members interconnected by a splice member in a manner such that no obstruction is provided to merchandise flowing down the shelf past the splice member.

Yet another object of the invention is to provide for an elongated storage shelf an improved shelf support for supporting the shelf intermediate the ends thereof upon an associated intermediate support column.

Still another object of the invention is to provide an intermediate guide member for use in an elongated storage shelf.

Further objects of the invention pertain to the particular arrangement of the parts in the gravity-feed merchandise storage and delivery rack whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 4 is a plan view of a storage shelf made in accordance with and embodying the principles of the present invention;

FIG. 5 is a view in longitudinal section along the line 5—5 of FIG. 4;

FIG. 6 is an enlarged fragmentary view in vertical section, with certain portions broken away, along the line 6—6 in FIG. 4;

FIG. 7 is a view in vertical section along the line 7—7 of FIG. 6;

FIG. 8 is a further enlarged view in transverse section through an intermediate guide member illustrated in FIGS. 4 to 7 of the drawings;

FIG. 9 is a plan view on an enlarged scale with certain portions broken away showing the splice between the adjacent ends of side frame members of the storage shelf of FIG. 4;

FIG. 10 is a side elevational view of the parts of FIG. 9;

DESCRIPTION OF THE PREFERRED EMBODIMENTS

Figure 1:
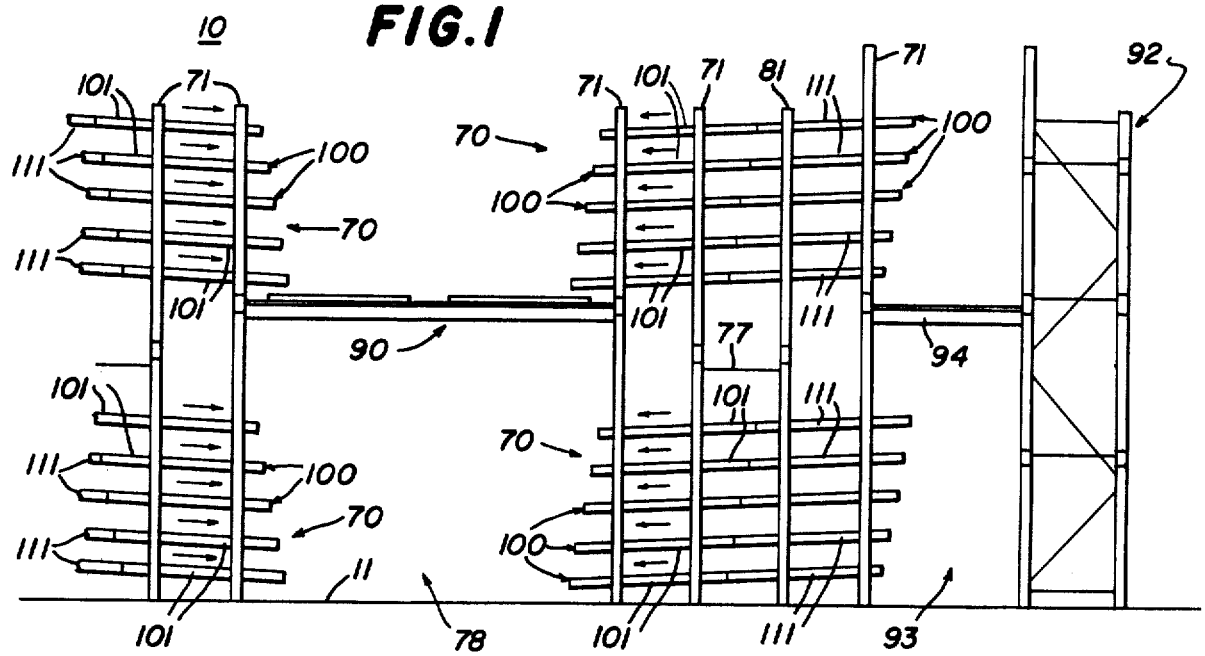
FIG. 1 is a fragmentary elevational view of a mezzanine construction incorporating the gravity-feed merchandise storage and delivery rack of the present invention.

Referring to FIG. 1 of the drawings, there is illustrated a gravity-feed merchandise storage and delivery rack, generally designated by the numeral 10, which is disposed upon the floor 11 of a warehouse, factory or the like, and includes a plurality of substantially identical storage rack units or bays 70, each of which is designed for the gravity-feed storage of a plurality of packages or cartons 16 (see FIG. 2) of merchandise in a well-known manner. While the system 10 illustrated in FIG. 1 is a mezzanine-type arrangement comprising two levels of storage, it will be understood that single-level systems may also be used. Such systems typically comprise a plurality of storage rack bays 70 arranged side-by-side in a straight line along a transport aisle to provide a storage system of any desired length.

Figure 2:
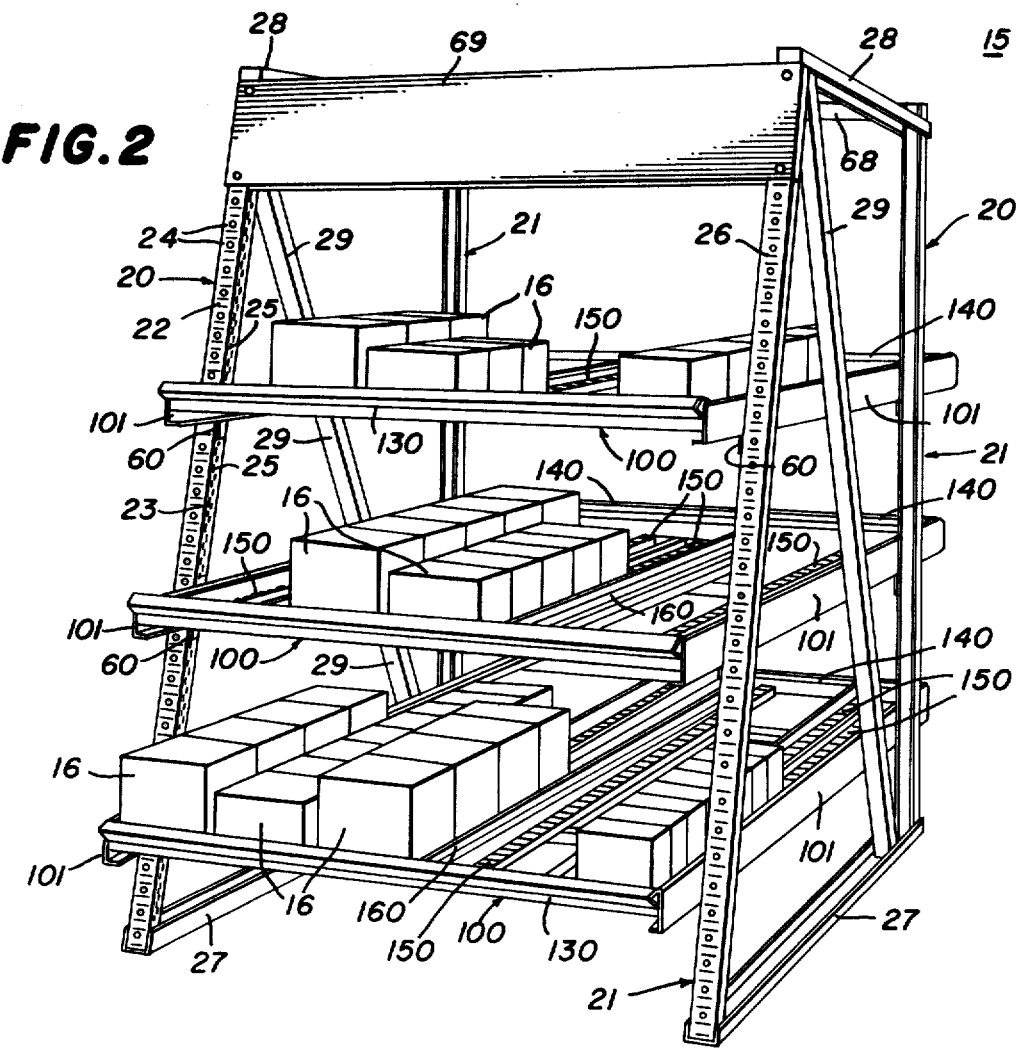
FIG. 2 is a perspective view of a single storage rack bay constructed in accordance with and embodying the features of the present invention.

There is illustrated in FIG. 2 a single storage rack bay 15 including a pair of upstanding support frames, generally designated by the numeral 20, between which are mounted a plurality of vertically-spaced storage shelves generally designated by the numeral 100. Each support frame 20 includes at least two upright support columns 21 respectively disposed at the front and rear of the support frame 20, each column 21 being generally channel-shaped in transverse cross section and including a main wall 22 and two side walls 23. The main wall 22 has a plurality of longitudinally equidistantly spaced-apart circular apertures 24 therein, while each of the side walls 23 has a plurality of longitudinally spaced-apart rectangular slots 25 therein, the slots 25 preferably being arranged in two parallel rows, with the slots of one row being longitudinally offset with respect to the slots of the other row a distance equal to one-half the distance between the adjacent slots in a row. Preferably, this distance between adjacent slots in the same row is one inch. The main wall 22 is also provided with a plurality of indicia 26 comprising a scale for measuring distance along the column 21, these indicia 26 preferably being disposed at one-inch intervals. Suitable numerals may also be inscribed at intervals along the columns 21 to facilitate reading of the scale. The above described construction is better illustrated in Applicants' copending application Ser. No. 136,396, the disclosure of which is incorporated herein by reference in its entirety.

Each of the support columns 21 is fixedly secured at the lower end thereof to a bottom rail 27 and at the upper end thereof to a top rail 28, the bottom and top rails 27 and 28 also being interconnected by a diagonal brace 29, the members 27, 28 and 29 all being of channel-shaped construction. While the support frames 20 are illustrated in FIG. 2 with the rearmost support columns 21 thereof vertical and with the frontmost support columns 21 thereof inclined rearwardly, it will be appreciated that the support frames 20 may also be formed with the front and rear support columns thereof parallel, either vertical or inclined rearwardly. It will be understood that additional support columns 21 and diagonal braces 29 may be provided, as necessary, depending upon the overall front-to-back depth of the support frames 20. It will also be understood that as additional storage rack bays 15 are added to the system, each additional bay requires only one additional support frame 21, since it will share a support frame 21 in common with the adjacent bay 15.

Figure 3:
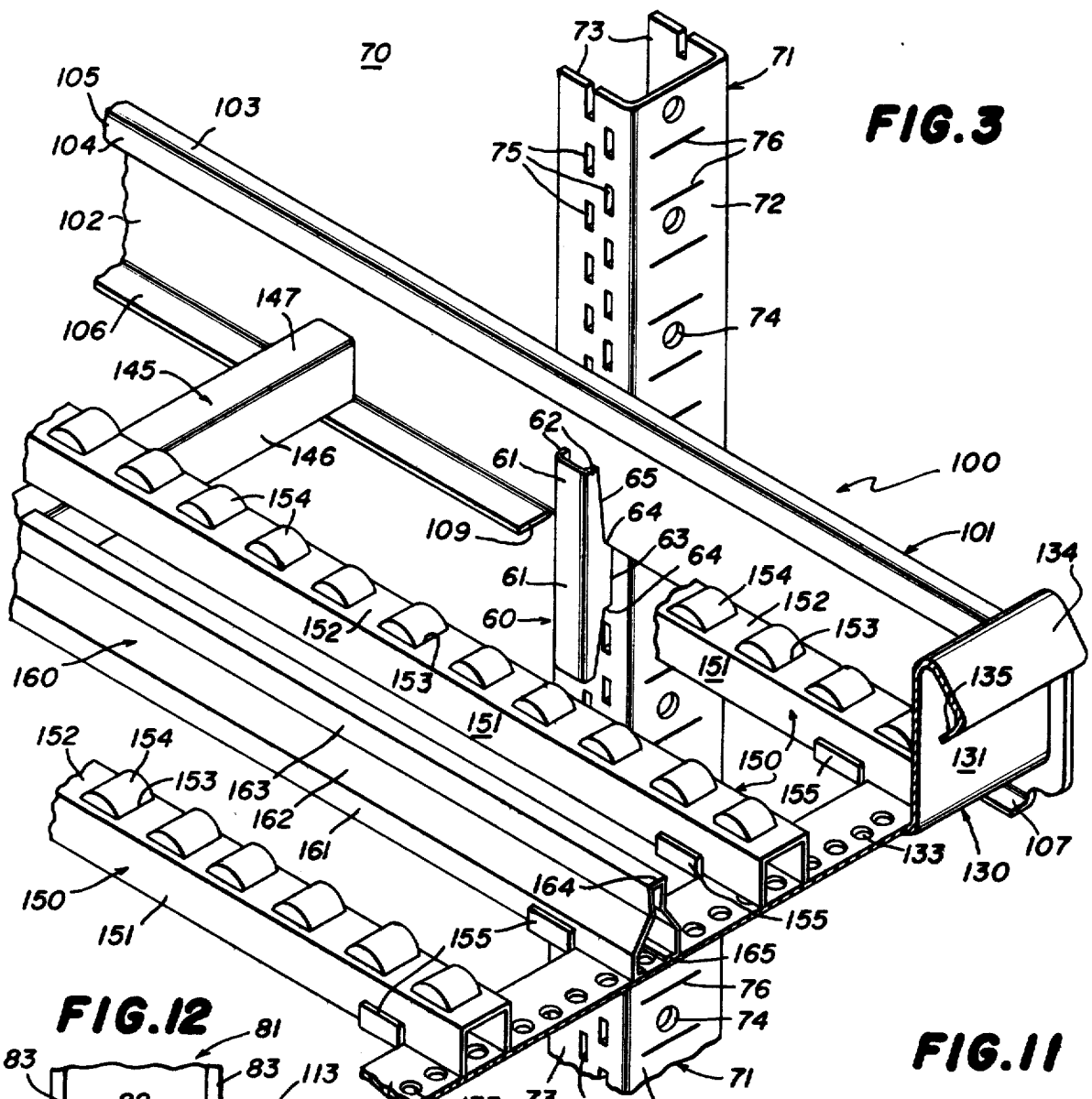
FIG. 3 is an enlarged fragmentary perspective view of one of the storage shelves of the storage rack of FIG. 1, with portions thereof broken away more clearly to illustrate the construction thereof and the mounting thereof upon a support column.
Figure 12:
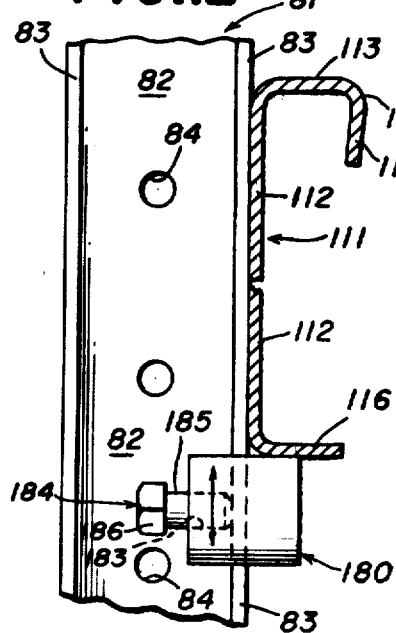
FIG. 12 is an enlarged view in vertical section along the line 12—12 of FIG. 11.

Referring now to FIG. 3 of the drawings, a portion of a storage rack bay 70 has been illustrated in greater detail and more specifically there is illustrated a portion of a front support column 71 and a storage shelf 100 of the present invention. The support column 71 is constructed generally like the support column 21 described above and includes a generally channel-shaped cross section having a main wall 72 and two side walls 73. The main wall 72 has a plurality of longitudinally equidistantly spaced-apart circular apertures 74 therein, while each of the side walls 73 has a plurality of longitudinally spaced-apart rectangular slots 75 therein, the slots 75 preferably being arranged in two parallel rows, with the slots of one row being longitudinally offset with respect to the slots of the other row a distance equal to one-half the distance between adjacent slots in a row. Preferably, this distance between adjacent slots in the same row is about one inch. The main wall 72 is also provided with a plurality of indicia 76 comprising a scale for measuring distance along the column 71, these indicia 76 preferably being disposed at one-inch intervals. Suitable numerals may also be inscribed at intervals along the columns 71 to facilitate reading of the scale.

Referring also to FIGS. 4, 5, 9 and 10, the storage shelf 100 includes a pair of laterally spaced-apart side frame members, each of the side frame members including a forward side frame member 101 and a rearward side frame member 11 (see FIG. 1 also) that are secured at the adjacent ends thereof by a splice member 120. Each of the side frame members are constructed substantially as mirror images of the other and each comprises a forward side frame member 101 and a rearward side frame member 111. Each of the forward side frame members 101 includes a main wall 102 substantially rectangular in shape and provided at the upper edge thereof with a laterally inwardly extending top flange 103 having a depending or downturned flange 104 thereon, the main wall 102 being provided at the lower edge thereof with a laterally inwardly extending bottom flange 106. The downturned flange 104 provides a bearing surface 105 against which merchandise is guided during use of the storage shelf 100 and the bottom flange 106 is provided at the forward end thereof with a stop flange 107. The top flange 103 has cutouts 108 therein at each end thereof, while the bottom flange 106 has a U-shaped cutout 109 at the forward end that serves to position the shelf 100 with respect to the columns 71 and a cutout 110 adjacent to the rear end thereof (see FIG. 5 particularly). Each of the rearward side frame members 111 also includes an elongated flat planar main wall 112 substantially rectangular in shape and provided at the upper edge thereof with a laterally inwardly extending top flange 113 having a depending or downturned flange 114 thereon, the main wall 112 being provided at the lower edge thereof with a laterally inwardly extending bottom flange 116. The downturned flange 114 provides a bearing surface 115 (see FIG. 9) to engage and guide merchandise stored on the storage shelf 100. The top flange 113 has cutouts 118 therein (see FIG. 5) adjacent to the forward and rear ends thereof, while the bottom flange 116 has cutouts 119 therein adjacent to the rear end thereof providing a flange 117.

The adjacent ends of the forward and rearward side frame members 101 and 111 are interconnected by a splice member 120, see FIGS. 4, 5, 9 and 10. Each splice member 120 includes a generally rectangular first panel 121 having two spaced-apart holes 122 therein and a generally rectangular second panel 124 also having two spaced-apart holes 125 therein. The first and second panels 121 and 124 are connected by an offset portion 123. The adjacent ends of the side frame members 101 and 111 also have holes therein in alignment with the holes 122 and 125, and these aligned holes receive bolts 126 therethrough secured in place by nuts 127. As is best seen in FIGS. 4 and 9 the bearing surface 115 on the upstream or higher level is offset inwardly with respect to the bearing surface 105 on the downstream or lower level, whereby there are no obstructions to the easy passage of merchandise articles 16 from the bearing surface 115 onto the bearing surface 105.

The forward ends of the forward side frame members 101 are interconnected by a front frame member 130, the construction of which is best illustrated in FIGS. 3 through 5 of the drawings. The front frame member 130 includes a generally vertically disposed wall 131 having a rearwardly extending attachment flange 132 on the bottom thereof, the attachment flange 132 having a plurality of holes 133 therein. A front flange 134 extends forwardly and downwardly with respect to the vertical wall 131 and carries on the forward edge thereof a downwardly and inwardly inturned flange 135 which may conveniently form a handle or handgrip for facilitating handling of the storage shelf 100. The flange 135 may be used for affixing thereto a label, name plate or the like to identify the merchandise stored on the storage shelf 100.

The rear ends of the rearward side frame members 111 are interconnected by a rear frame member 140, the details of construction of which are best illustrated in FIGS. 4 and 5 of the drawings. The rear frame member 140 includes a generally vertical wall 141 having a forwardly extending rectangular attachment flange 142 which is preferably also provided with a plurality of equidistantly longitudinally spaced-apart holes 143 (see FIG. 4) therein. The upper edge of the vertical wall 141 carries a rearwardly extending flange 144 that is also useful in gripping and moving the storage shelf 100. There also are provided two more cross channels 145 each having a vertical wall 146 and parallel horizontal walls 147 having aligned openings 148 therein (see also FIG. 6). The cross channels 145 are fixedly secured to the adjacent forward or rearward side frame members 101 or 111, as the case may be, as by welding.

Each of the storage shelves 100 also includes a plurality of wheel tracks, generally designated by the numeral 150. Referring to FIG. 3, each of the wheel tracks 150 includes an elongated channel member having a pair of legs 151 interconnected by a bight portion 152, the bight portion 152 having a plurality of longitudinally spaced-apart rectangular apertures or openings 153 therein. Mounted between the legs 151 is a plurality of shafts or axles (not shown) respectively rotatably carrying roller wheels 154 which respectively project upwardly through the openings 153 in the bight portion 152. In use, each of the wheel tracks 150 is disposed with the bight portion 152 thereof positioned upwardly and with the opposite ends of the legs 151 respectively overlying the attachment flanges 132 and 142 on the front and rear frame members 130 and 140, respectively. Preferably, attachment clips 155 are secured to the front and rear ends of each of the wheel tracks 150, the attachment clips 155 extending beneath the attachment flanges 132 and 142 and having projections (not shown) which extend upwardly through the holes 133 and 143 thereby fixedly to position the wheel tracks 150 on the storage shelf 100. Preferably, the wheel tracks 150 are arranged in pairs, each pair of wheel tracks 150 defining a front-to-back path along the storage shelf 100 for supporting a row of cartons 16, the lateral spacing of the wheel tracks 150 in each pair varying with the width of the associated carton 16 to be supported thereon. It will be appreciated that in the event of unusually wide cartons, more than two wheel tracks 150 may be provided in each path to provide the necessary support for the cartons.

The carton paths are separated by elongated intermediate guide members 160 which are generally in the shape of inverted channel members, the front and rear ends of which respectively overlie the attachment flanges 132 and 142 and are secured thereto by attachment clips 155 in the same manner as are the wheel tracks 150. The intermediate guide members 160 cooperate with each other and with the side frame members 101-111 of the storage shelf 100 to guide the carton 16 along the wheel track paths and to limit the lateral movement thereof. The wheel tracks 150 overlie the cross channels 145, the upper flanges of which are arranged to be substantially coplanar with the attachment flanges 132 and 142. The intermediate guide members 160 also rest upon the cross channels 145 and are supported thereby and are laterally fixedly positioned with respect thereto as will be described more fully hereinafter.

Details of the construction of the intermediate guide members 160 is best illustrated in FIGS. 6 to 8 of the drawings, wherein it will be seen that each intermediate guide member 160 includes two spaced-apart lower walls 161 arranged substantially parallel to each other and having integrally attached to the upper edges thereof inwardly directed walls 162 that are connected to upper walls 163. The upper edges of the upper walls 163 are joined by a connecting wall 164. The lower edges of the lower walls 161 each carry inturned flanges 165 that are directed toward each other and lie essentially in the same plane. Referring to FIGS. 4 and 5, it will be seen that the intermediate guide members 160 extend essentially the length of the associated storage shelf 100. Disposed between the lower walls 161 is a generally rectangular nut 170 having a threaded opening centrally thereof receiving a pin 175 therethrough. More specifically, the pin 175 has a threaded portion 176 that threadedly engages the threaded opening in the nut 170 and extends upwardly and has an upper end 178 that bears against the inner surface of the connecting wall 164 of the intermediate guide member 160. A portion of the pin 175 extends outwardly with respect to the nut 170 and includes a knurled portion 177 that can be grasped by a user rotatably to adjust the position of the pin 175 with respect to the nut 170. The lower end of the pin 175 as viewed in FIG. 8 is pointed as at 179 to assist in inserting the pin 175 into the aligned openings 148 in the cross channel 145.

In the use of the intermediate guide member 160, the pin 175 is positioned along the intermediate guide member 160 so that the pointed end 179 thereof can be readily inserted in the desired pair of aligned openings 148 in the associated cross channel 145. This is accomplished by the user grasping the knurled portion 177 and loosening the nut 170 with respect to the intermediate guide member 160, after which the nut 170 can be moved readily to the desired adjusted position. The user then grasping the knurled portion 177 threads the pin 175 upwardly with respect to the nut 170 until the upper end 178 of the pin 175 bears against the connecting wall 164. This action urges the nut 170 against the adjacent inturned flanges 165 thus frictionally to fix the location of the pin 175 along the length of the intermediate guide member 160. In order to mount the intermediate guide member 160 into the desired position, the users need only grasp the outer ends of the intermediate guide member 160, and after inserting the pin 175 into the appropriate openings 148 in the cross channel 145, the intermediate guide member 160 rests upon the attachment flanges 132 and 142 and the cross channel 145. By attaching the attachment clips 155, the intermediate guide member 160 is now in the appropriate mounted position thereof. The presence of the pin 175 extending through the aligned openings 148 in the cross channel prevents the merchandise being guided by the intermediate guide member 160 from moving the intermediate guide member 160 from its adjusted position.

Since many of the storage shelves 100 have lengths in excess of eight feet, and even have lengths in the range of fifteen to twenty feet, it is evident that the pin 175 cannot be reached from either end of the storage shelf 100. Furthermore, the storage shelves 100 may well be spaced apart only eight inches or ten inches vertically. In such constructions, it would be necessary to disassemble the rack in order to be able to reach the middle portion of the intermediate guide member 160 and make any type of manual connection. Using the construction of the present invention, it is possible to install or move the intermediate guide member 160 from either end thereof without any disassembly of the associated rack. This is accomplished by simply removing the attachment clips 155 at each end of the intermediate guide member 160 and lifting the intermediate guide member 160 upwardly until the pointed end 179 of the pin 175 clears the upper opening 148 in the cross channel 145. The intermediate guide member 160 then can be moved to the new desired adjusted position and the pointed end 179 of the pin 175 inserted in the newly selected opening 148 in the cross channel 145. After lowering the intermediate guide member 160 until it rests upon the attachment flanges 132 and 142 and the cross channel 145, the attachment clips 155 are re-engaged, thus fixedly to mount the intermediate guide member 160 in the new adjusted position thereof.

Referring to FIG. 3 of the drawings, the storage shelves 100 are mounted on the support columns 71 by the use of mounting clips, generally designated by the numeral 60. Each mounting clip 60 is generally channel-shaped in transverse section, including an elongated flat rectangular main wall 61 and two side walls 62 respectively integral with the main wall 61 and projecting therefrom along the side edges thereof. The side walls 62 are respectively provided with elongated substantially coplanar bearing surfaces 63 intermediate the ends thereof. The bearing surfaces 63 are substantially parallel to the main wall 61 and are respectively connected at the opposite ends thereof by short support shoulders 64 to guide surfaces 65 which extend from the support shoulders 64 to the adjacent ends of the mounting clip 60 are are inclined outwardly toward the main wall 61.

Preferably, the support shoulders 64 are substantially normal to the bearing surfaces 63, while the guide surfaces 65 are inclined at an angle of about 5° to the bearing surfaces 63. One of the side walls 62 is provided with two prongs (not shown) projecting from the corresponding bearing surface 63 away from the main wall 61, the prongs being connected to the bearing surface 63 by a narrow neck (now shown). The prongs are shaped complementary to the rectangular slots 75 in the support columns 71 and are spaced apart the same distance as are the slots 75. The other side wall 62 of the mounting clip 60 has a single prong (not shown) projecting from the bearing surface 63 thereof and positioned midway between the prongs of the first side wall 62.

In use, the mounting clip 60 is attached to a support column 71 by inserting the prongs into selected ones of the slots 75. When disposed in the mounted configuration illustrated in FIG. 3, the bearing surfaces 63 of the mounting clip 60 will be disposed in engagement with the outer surface of the support column side wall 73. In use, two mounting clips 60 are respectively fastened to the inner surfaces of the frontmost support columns of the storage rack bay 70 at a first vertical level, and two mounting clips 60 are respectively mounted on the inner side walls of the rearmost ones of the support columns 71 at a second vertical level which is slightly higher than the first level of the front clips, the indicia 76 on the support columns 71 serving to facilitate accurate positioning of the mounting clips 60 thereon. Further details of construction of the mounting clip 60 and the cooperation thereof with the support columns 71 will be found in the Applicants' copending application Ser. No. 136,396 referred to above.

Because of the elevation of the rear mounting clip 60 with respect to the front mounting clip 60, there will be a slight inclination of the storage shelf 100 which will cause the carton 16 to roll downwardly and forwardly along the paths of the wheel tracks 150 in a well-known manner. Thus, cartons may be added to each row of cartons at the rear end thereof and will progress downwardly for removal at the front end of the storage shelf 100. While the storage shelves 100 will serve as cross members of the storage rack bay 15 for holding the support frames upright, there is preferably also provided an angle brace 68 interconnecting the rearmost support columns 21 in FIG. 2 at the upper ends thereof, and a sway brace 69 interconnecting the frontmost support columns 21 at the upper ends thereof, further to rigidify the storage rack structure, the angle brace 68 and sway brace 69 being fixedly secured to the support frames by means of suitable fasteners extending through the circular holes 24 in the support columns 21. While the storage shelves 100 illustrated in the drawings are all of the substantially flat type, it will be understood that the shelves 100 could have the front ends thereof downwardly inclined at various angles, as illustrated in U.S. Pat. No. 3,900,112, to facilitate removal of tall items from the carton 16, all as is well-known in the art.

Referring to FIG. 1 of the drawings, there is illustrated the mezzanine-type construction in which two rows of storage rack bays 70 are stacked one on top of the other. While it is possible to stack storage rack bays 15 of the type illustrated in FIG. 2, with rearwardly inclined front support columns, it is much more convenient to stack storage rack bays having all vertical support columns, such as the bays 70 illustrated in FIG. 1. Each vertical support column 71 of the upper bay 70 may be directly connected in vertical alignment with the corresponding support column 71 of the lower bay 70, with cross braces 77 utilized where necessary to stabilize the arrangement. In practice, two stacks of the bays 70 are arranged facing each other on opposite sides of an aisle 78. A mezzanine platform 90 spans the aisle 78 at the top of the lower bays 70, stairways (not shown) being provided at predetermined points along the aisle 78 to provide access to the mezzanine platform 90. Preferably, there is provided behind each of the stacks of storage racks and bays 70, a pallet storage rack 92 (one shown) which is spaced from the rear end of the associated bay 70 by an aisle 93. A catwalk 94 spans the aisle 93 and interconnects the pallet storage rack 92 and the storage rack bay 70 at the top of the lower bay 70. It will be understood that the pallet storage rack 92 extends the entire length of the row of storage rack bays 70. In use, pallets containg reserve stocks of cartons 16 are stored on the pallet storage racks 92 and cartons 16 are removed therefrom and inserted at the rear ends of the storage shelves 100 of the storage rack bays 70 for restocking thereof by personnel walking along the aisle 93 and the catwalk 94. Preferably, conveyors may be provided along the aisle 78 and the platform 90 for order-picking purposes. Personnel can then walk along the aisle 78 and the platform 90 and remove cartons or individual items from the storage shelves 100 and deposit them in containers for transmission along the conveyors in a well-known manner.

Figure 13:
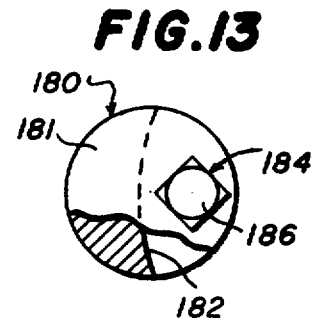
FIG. 13 is an enlarged end view of the shelf support of FIGS. 11 and 12 with certain portions broken away.
Figure 11:
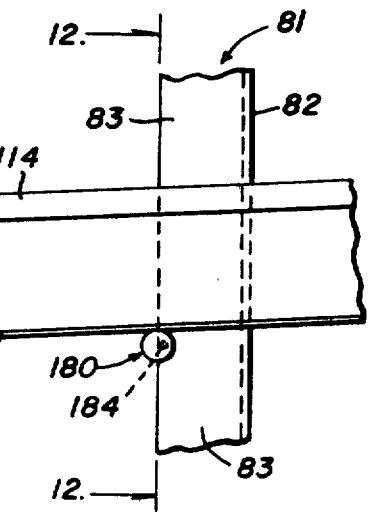
FIG. 11 is an enlarged fragmentary view showing the interconnection between an intermediate support column, a storage shelf and the shelf support therefor.

When the storage shelves 100 are of considerable length, such as ten to twenty feet, it is necessary to provide intermediate support columns 81 and also to provide shelf supports 180 for supporting the storage shelves 100 intermediate the ends thereof (see FIGS. 4, 5 and 11 to 13). The intermediate columns 81 each comprise a longitudinally extending main wall 82 having side walls 83 thereon parallel to each other and substantially normal to the main wall 82. The main wall 82 also has longitudinally spaced apart circular holes 84 therein. In order to support the storage shelf 100 upon the intermediate columns 81, the shelf supports 180 have been provided. Each shelf support 180 is formed as a generally cylindrical body 181 having an arcuate slot 182 cut therethrough parallel to the ends thereof, the arcuate slot 182 extending slightly more than halfway through the cylindrical body 181 as is best illustrated in FIG. 13. One end of the cylindrical body 181 has a threaded opening 183 therein that extends into the arcuate slot 182 and receives a bolt 184 having a threaded shank 185 threadedly engaging in the opening 183 and having a head 186 on the outer end thereof. In operation, the arcuate slot 182 receives one of the side walls 83 of the intermediate column 81 therein, and tightening of the bolt 184 against the adjacent surface of the side wall 83 fixedly positions the shelf support 180 with respect to the side wall 83. The upper portion of this cylindrical body 181 receives thereon and supports the bottom flange 116 of an associated rearward side frame member 111 on the storage shelf 100. It is pointed out that the shelf support 180 is infinitely adjustable along the side wall 83 so that adequate support for the storage shelf 100 can be provided at any desired level on the intermediate column 81.

In a constructional example of the present invention, the support columns 21, 71 and 81 as well as all of the other parts of the support frames including the sway braces 68 and 69 are preferably formed of steel as are side frame members 101 and 111, the front frame members 130, the rear frame members 140 and the cross channels 145. The wheel tracks 150 and intermediate guide members 160 are formed of galvanized steel and the roller wheels 154 preferably are formed of high-density polyethylene. The mounting clips 60 are formed of plated steel and the attachment clips 54 are formed of a suitable plastic.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A storage shelf for use in a gravity-feed merchandise storage and delivery rack comprising two spaced-apart side frame members interconnected by front and rear frame members, merchandise support tracks mounted between said front and rear frame members and defining parallel rows of merchandise, a cross frame member interconnecting said side frame members between said front and back frame members and below said support tracks, an intermediate guide member mounted between said front and rear frame members and upon said cross frame member and separating adjacent rows of merchandise from each other, and attachment structure adjustable longitudinally of said intermediate guide member and readily removably interconnecting said intermediate guide member and said cross frame member to prevent lateral displacement between said intermediate guide member and said cross frame member as a result of contact with merchandise while permitting quick adjustment of the position therebetween with access only to the ends of said intermediate guide member.

2. The storage shelf set forth in claim 1, wherein the distance between said cross frame member and said front and rear frame members is at least about four feet, whereby said cross frame member and the attachment structure on said intermediate guide member are not accessible from the ends of said storage shelf.

3. A storage shelf for use in a gravity-feed merchandise storage and delivery rack comprising two spaced-apart side frame members interconnected by front and rear frame members, merchandise support tracks mounted between said front and rear frame members and defining parallel rows of merchandise, a cross frame member interconnecting said side frame members between said front and back frame members and below said support tracks, an intermediate guide member mounted between said front and rear frame members and upon said cross frame member and separating adjacent rows of merchandise from each other, and attachment structure readily removably interconnecting said intermediate guide member and said cross frame member, said attachment structure including a pin mounted on said intermediate guide member and a plurality of holes in said cross frame member, said pin engaging in a selected one of said holes to prevent lateral displacement between said intermediate guide member and said cross frame member as a result of contact with merchandise while permitting quick adjustment of the position therebetween with access only to the ends of said intermediate guide member.

4. The storage shelf set forth in claim 3, wherein the position of said pin is infinitely adjustable along the length of said intermediate guide member.

5. The storage shelf set forth in claim 3, wherein said cross frame member has laterally extending flanges having aligned holes therein for receiving the associated pin therethrough.

6. A storage shelf for use in a gravity-feed merchandise storage and delivery rack comprising two spaced-apart side frame members interconnected by front and rear frame members, merchandise support tracks mounted between said front and rear frame members and defining parallel rows of merchandise, a cross frame member interconnecting said side frame members between said front and rear frame members and below said support tracks, an intermediate guide member mounted between said front and rear frame members and upon said cross frame member and separating adjacent rows of merchandise from each other, said intermediate guide member including two longitudinally extending side walls having one of the edges thereof joined by a connecting wall and having inturned flanges on the other edges of said side walls directed inwardly toward each other, a nut supported between said side walls on said inturned flanges and having a threaded opening therein and being capable of being positioned at any place along the length of said intermediate guide member, and a pin having a threaded portion engaging in said threaded nut and extending upwardly and engaging the inner surface of said connecting wall thus to fix the position of said nut and said pin along the length of said intermediate guide member and having an engaging portion extending beyond said nut, said cross frame member having a plurality of holes therein for receiving the engaging portion of said pin at any one of a number of adjusted lateral positions with respect to said storage shelf, the pin on said intermediate guide member when engaged in one of the openings in said cross frame member serving fixedly to position said intermediate guide member with respect to said cross frame member to prevent lateral displacement therebetween as a result of contact with merchandise, said pin being readily removable from the associated opening in said cross frame member to permit quick adjustment of the position between said intermediate guide member and said cross frame member while having access only to the ends of said intermediate guide member.

7. The storage shelf set forth in claim 6, wherein said cross frame member has laterally extending flanges having aligned holes therein for receiving the associated pin therethrough.

8. The storage shelf set forth in claim 6, wherein the side walls of said intermediate guide member converge toward said connecting wall with said connecting wall having an internal dimension only slightly greater than the adjacent end of said pin.

9. The storage shelf set forth in claim 6, wherein said nut is rectangular in shape and fits snugly between said side walls upon said inturned flanges.

10. The storage shelf set forth in claim 6, wherein the engaging portion of said pin is pointed to facilitate insertion thereof into the holes in said cross frame member.

11. The storage shelf set forth in claim 6, wherein the surface of said engaging portion of said pin is knurled to facilitate tightening and loosening thereof manually.

12. An intermediate guide member comprising two longitudinally extending side walls joined on one edge thereof by a connecting wall, inturned flanges on the other edges of said side walls directed inwardly toward each other, a nut supported between said side walls on said inturned flanges and having a threaded opening therein and being capable of being positioned at any place along the length of said inturned flanges, and a pin having a threaded portion engaging in said threaded nut and extending upwardly and engaging the inner surface of said connecting wall thus to fix the position of said nut and said pin along the length of said inturned flanges, said pin having an engaging portion extending beyond said nut in a direction opposite to said threaded portion.

13. The intermediate guide members set forth in claim 12, wherein the side walls of said intermediate guide member converge toward said connecting wall with said connecting wall having an internal dimension only slightly greater than the adjacent end of said pin.

14. The intermediate guide member set forth in claim 12, wherein said nut is rectangular in shape and fits snugly between said side walls upon said inturned flanges.

15. The intermediate guide member set forth in claim 12, wherein the engaging portion of said pin is pointed to facilitate insertion thereof into the holes in an associated member.

16. The intermediate guide member set forth in claim 12, wherein the surface of said engaging portion of said pin is knurled to facilitate tightening and loosening thereof manually.

* * * * *